US012590461B2

(12) United States Patent
Gurung et al.

(10) Patent No.: US 12,590,461 B2
(45) Date of Patent: Mar. 31, 2026

(54) ADHESIVE COMPOSITION AND ASSOCIATED METHOD

(71) Applicant: BMIC LLC, Dallas, TX (US)

(72) Inventors: Laxman Gurung, Parsippany, NJ (US); Lingtao Yu, Summit, NJ (US)

(73) Assignee: BMIC LLC, Dallas, TX (US)

( * ) Notice: Subject to any disclaimer, the term of this patent is extended or adjusted under 35 U.S.C. 154(b) by 0 days.

(21) Appl. No.: 19/187,660

(22) Filed: Apr. 23, 2025

(65) Prior Publication Data

US 2025/0333963 A1 Oct. 30, 2025

Related U.S. Application Data

(60) Provisional application No. 63/638,178, filed on Apr. 24, 2024.

(51) Int. Cl.
*E04D 15/07* (2006.01)
*B05B 9/04* (2006.01)

(52) U.S. Cl.
CPC ............ *E04D 15/07* (2013.01); *B05B 9/0403* (2013.01)

(58) Field of Classification Search
CPC .............................. E04D 15/07; B05B 9/0403
See application file for complete search history.

(56) References Cited

U.S. PATENT DOCUMENTS 3,960,325 A 6/1976 Nienow et al.
4,240,583 A 12/1980 Hughes
4,629,094 A * 12/1986 Vogel ...................... E04D 15/07 222/413
6,817,798 B2 11/2004 Kugler et al.
7,713,365 B2 5/2010 Silvers et al.
8,596,555 B2 12/2013 Thompson et al.
9,498,792 B2 * 11/2016 Miller .................. E04F 21/023
9,669,602 B2 6/2017 Miller
10,434,538 B2 10/2019 Calaman et al.
11,396,617 B2 7/2022 Rufus et al.
11,401,449 B2 8/2022 Kelley et al.
11,472,988 B2 10/2022 Yu et al.
11,486,138 B2 11/2022 Chich et al.
11,686,094 B2 6/2023 Tang et al.
11,718,773 B2 8/2023 Yu et al.
11,779,945 B2 10/2023 Thompson et al.
11,781,320 B2 10/2023 Yu et al.
11,802,228 B2 10/2023 Kelley et al.
11,987,729 B2 5/2024 Rufus et al.
12,024,895 B2 7/2024 Yu et al.
2011/0097485 A1 4/2011 Breeden et al.
2012/0107515 A1 5/2012 Johnston
2016/0032158 A1 2/2016 Tang et al.
2016/0108296 A1 4/2016 Tang
2018/0266114 A1 9/2018 Tang et al.
(Continued)

*Primary Examiner* — Nathan T Leong
(74) *Attorney, Agent, or Firm* — GREENBERG TRAURIG, LLP

(57) ABSTRACT

A method includes obtaining a spray device having a pump and a container containing an adhesive composition that does not include a propellant, operating the pump to pressurize the adhesive composition in the container to a pressure of 1 psi to 200 psi, spraying the adhesive composition from the container onto a roofing substrate to form an adhesive layer on the roofing substrate, and applying a roofing material to the adhesive layer on the roofing substrate.

20 Claims, 2 Drawing Sheets

(56) References Cited

U.S. PATENT DOCUMENTS

| | | | |
|---|---|---|---|
| 2020/0131775 | A1 | 4/2020 | Tang et al. |
| 2023/0304291 | A1 | 9/2023 | Tang et al. |
| 2023/0313005 | A1 | 10/2023 | Yu et al. |
| 2024/0279515 | A1 | 8/2024 | Rufus et al. |

* cited by examiner

ADHESIVE COMPOSITION AND ASSOCIATED METHOD

CROSS-REFERENCE TO RELATED APPLICATIONS

The present application claims priority to and benefit of U.S. Provisional Patent Application No. 63/638,178, filed Apr. 24, 2024 and entitled "ADHESIVE COMPOSITION AND ASSOCIATED METHOD," the entirety of which is herein incorporated by reference.

FIELD

The present invention is directed to an adhesive composition and a method of spraying an adhesive composition, and, more specifically, to an adhesive composition sprayed on a roofing substrate to adhere a roofing material to the roofing substrate, and associated methods.

BACKGROUND

An adhesive composition may be used to adhere a roofing material, such as a membrane, to a low slope roofing substrate.

SUMMARY

Some embodiments relate to a method. In some embodiments, the method comprises obtaining a spray device. In some embodiments, the spray device comprises a pump. In some embodiments, the spray device comprises a container. In some embodiments, the container contains an adhesive composition. In some embodiments, the adhesive composition does not comprise a propellant. In some embodiments, the adhesive composition has a viscosity of 2000 cP or less, when measured at a temperature of 25° C. using a Brookfield viscometer with a spindle #2 and a viscometer speed of 20 RPM for 1 minute. In some embodiments, the method comprises operating the pump to pressurize the adhesive composition in the container to a pressure of 1 psi to 200 psi. In some embodiments, the method comprises spraying the adhesive composition from the container onto a roofing substrate to form an adhesive layer on the roofing substrate. In some embodiments, the method comprises applying a roofing material to the adhesive layer.

In some embodiments, the spraying comprising spraying the adhesive composition at a coverage rate of 500 $ft^2$ to 2000 $ft^2$ per 5 gallons of the adhesive composition.

In some embodiments, the adhesive layer has a thickness of 1 mil to 200 mils.

In some embodiments, the spraying comprises spraying the adhesive composition from the container at a rate of 0.1 GPM to 5 GPM.

In some embodiments, a solids content of the adhesive composition is 2.5% to 90% by weight based on a total weight of the adhesive composition.

In some embodiments, the roofing substrate comprises at least one of a wood, a coverboard, a polyisocyanurate board, a fiberglass insulation board, a metal, a gypsum board, a concrete, or any combination thereof.

In some embodiments, the pump comprises a pump powered by at least one of electricity, a battery, or any combination thereof mp.

In some embodiments, the roofing material comprises at least one of an underlayment, an insulation board, a roofing membrane, or any combination thereof.

Some embodiments relate to a method. In some embodiments, the method comprises obtaining a container. In some embodiments, the container contains an adhesive composition. In some embodiments, the adhesive composition does not comprise a propellant. In some embodiments, the adhesive composition has a viscosity of 2000 cP or less, when measured at a temperature of 25° C. using a Brookfield viscometer with a spindle #2 and a viscometer speed of 20 RPM for 1 minute. In some embodiments, the method comprises obtaining a pump. In some embodiments, the method comprises connecting the container with the pump to obtain a spray device. In some embodiments, the method comprises operating the pump to pressurize the adhesive composition in the container to a pressure of 1 psi to 200 psi. In some embodiments, the method comprises spraying the adhesive composition from the container onto a roofing substrate to form an adhesive layer on the roofing substrate. In some embodiments, the method comprises applying a roofing material to the adhesive layer.

In some embodiments, the spraying comprising spraying the adhesive composition at a coverage rate of 500 $ft^2$ to 2000 $ft^2$ per 5 gallons of the adhesive composition.

In some embodiments, the adhesive layer has a thickness of 1 mil to 200 mils.

In some embodiments, the spraying comprises spraying the adhesive composition from the container at a rate of 0.1 GPM to 5 GPM.

In some embodiments, a solids content of the adhesive composition is 2.5% to 90% by weight based on a total weight of the adhesive composition.

Some embodiments relate to a method. In some embodiments, the method comprises obtaining an adhesive composition. In some embodiments, the adhesive composition does not comprise a propellant. In some embodiments, the adhesive composition has a viscosity of 2000 cP or less, when measured at a temperature of 25° C. using a Brookfield viscometer with a spindle #2 and a viscometer speed of 20 RPM for 1 minute. In some embodiments, the method comprises obtaining a spray device. In some embodiments, the spray device comprises a pump. In some embodiments, the spray device comprises a container. In some embodiments, the method comprises filling at least a portion of the container with the adhesive composition. In some embodiments, the method comprises operating the pump to pressurize the adhesive composition in the container to a pressure of 1 psi to 200 psi. In some embodiments, the method comprises spraying the adhesive composition from the container onto a roofing substrate to form an adhesive layer on the roofing substrate. In some embodiments, the method comprises applying a roofing material to the adhesive layer.

In some embodiments, the spraying comprising spraying the adhesive composition at a coverage rate of 500 $ft^2$ to 2000 $ft^2$ per 5 gallons of the adhesive composition.

In some embodiments, the adhesive layer has a thickness of 1 mil to 200 mils.

In some embodiments, the spraying comprises spraying the adhesive composition from the container at a rate of 0.1 GPM to 5 GPM.

In some embodiments, a solids content of the adhesive composition is 2.5% to 90% by weight based on a total weight of the adhesive composition.

Some embodiments relate to a kit. In some embodiments, the kit comprises an adhesive composition. In some embodiments, the adhesive composition does not comprise a propellant. In some embodiments, the adhesive composition has a viscosity of 2000 cP or less, when measured at a temperature of 25° C. using a Brookfield viscometer with a spindle

#2 and a viscometer speed of 20 RPM for 1 minute. In some embodiments, the kit comprises a spray device. In some embodiments, the spray device comprises a pump. In some embodiments, the spray device comprises a container. In some embodiments, when the adhesive composition is contained in the container, the spray device is configured to spray, without a propellant, the adhesive composition onto a substrate to form an adhesive layer on the substrate.

In some embodiments, a solids content of the adhesive composition is 2.5% to 90% by weight based on a total weight of the adhesive composition.

DETAILED DESCRIPTION

Figure 1:
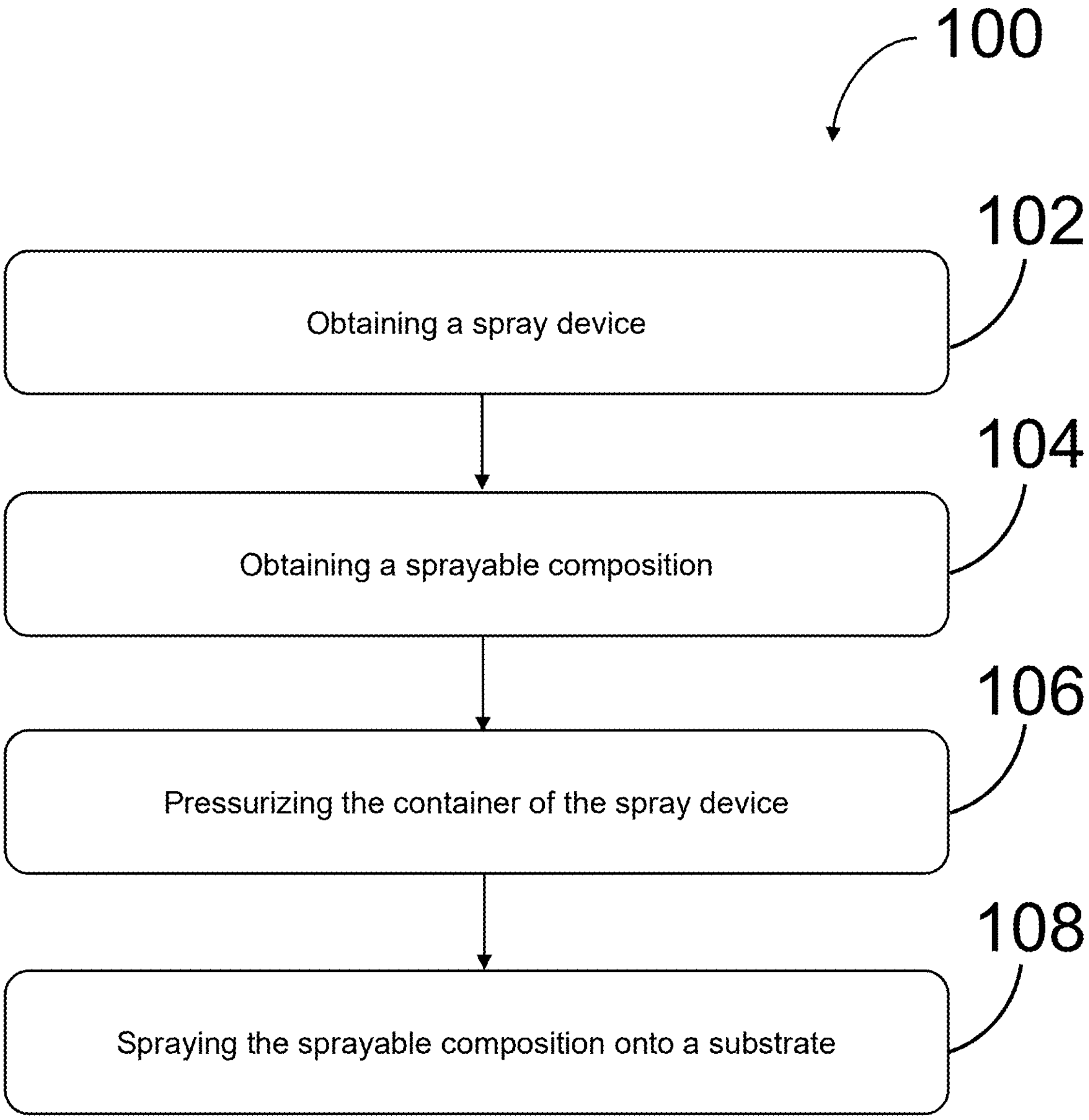
FIG. 1 is a flowchart of a method for applying an adhesive composition, according to some embodiments.

Some embodiments relate to a sprayable composition. In some embodiments, the sprayable composition does not include a propellant. Current sprayable compositions comprise solids, solvents, and propellants. Commonly used propellants include hydrocarbon propellants which are volatile organic compounds (VOCs) and are flammable. Due to safety concerns, the sprayable compositions that include hydrocarbon propellants require specialized equipment for handling, transport, and storage. While VOC-exempt and non-flammable propellants are commercially available, their use is often limited by significantly higher costs compared to conventional hydrocarbon propellants, making them potentially cost-prohibitive for many applications. Additionally, formulating with these alternative propellants can present technical challenges, as they may exhibit limited compatibility with certain resin systems and solvents, potentially compromising stability or performance. The sprayable compositions disclosed herein address these limitations by eliminating the need for propellants. Instead, they are applied using mechanical pressure generated either by a manual trigger sprayer, pump system, or other non-propellant-based delivery mechanism. The sprayable composition can be stored in metal containers or rigid plastic containers. In some embodiments, the sprayable composition is useful as at least one of an adhesive, a primer, a cleaner, a coating, or any combination thereof. In some embodiments, the sprayable composition comprises at least one of an adhesive composition, a primer composition, a cleaner composition, a coating composition, or any combination thereof.

In some embodiments, the sprayable composition comprises at least one polymer. In some embodiments, the at least one polymer comprises at least one of a styrenic polymer (e.g., a styrenic block copolymer), a polysiloxane, a polyurea, a polyurethane, a silyl-terminated polymer (e.g., a silyl-terminated polyester, a silyl-terminated polyurethane, a silyl-terminated polyolefin, etc.), a polyolefin, a thermoplastic polymer, an epoxy (e.g., an epoxy resin), an acrylic (e.g., an acrylic resin, a polyacrylic resin, a polymethylmethacrylate, etc.), a polyvinylidene fluoride, a polyvinylidene difluoride, any precursor thereof, any copolymer thereof, or any combination thereof. In some embodiments, the styrenic polymer comprises at least one of a styrene-butadiene-styrene (SBS) copolymer, a styrene-isoprene-styrene copolymer (SIS), a styrene-ethylene-butylene-styrene (SEBS) copolymer, or any combination thereof. In some embodiments, the acrylic comprises at least one of poly (methyl methacrylate) (PMMA), polyacrylonitrile (PAN), poly(hydroxyethyl methacrylate), poly(glyceryl methacrylate), poly(ethyl methacrylate), poly(isobutyl methacrylate), poly(acrylic acid), poly(α-methyl cyanoacrylate), an acrylic latex resin, acrylic-polyvinyl chloride (acrylic-PVC), acrylic-styrene, isobornyl methacrylate, isobornyl acrylate, ethyl methacrylate, isobutyl methacrylate, n-butyl methacrylate, ethyl acrylate, n-butyl acrylate, 2-hexyl ethyl acrylate, or any combination thereof.

In some embodiments, the sprayable composition comprises 1% to 75%, for example, 1%, 10%, 20%, 30%, 40%, 50%, 60%, 70%, or 75%, including ranges between any of the foregoing values, by weight of the at least one polymer based on a total weight of the sprayable composition.

In some embodiments, the sprayable composition comprises at least one tackifier. In some embodiments, the at least one tackifier comprises a rosin ester. In some embodiments, the rosin ester comprises at least one of a natural rosin ester, a synthetic rosin ester, or any combination thereof. In some embodiments, the rosin ester comprises at least one of a gum rosin ester, a tall oil rosin ester, a wood rosin ester, a rosin acid ester, or any combination thereof. In some embodiments, the rosin ester comprises a reaction product of a rosin and an alcohol. In some embodiments, the rosin ester comprises a reaction product of a rosin and an alcohol, wherein the rosin comprises a rosin acid and wherein the alcohol comprises a polyhydric alcohol. In some embodiments, for example, the polyhydric alcohol comprises at least one an ethylene glycol, a propylene glycol, a diethylene glycol, a triethylene glycol, a tetraethylene glycol, a trimethylene glycol, a glycerol, a trimethylolpropane, a trimethylolethane, a pentaerythritol, a mannitol, or any combination thereof. In some embodiments, the rosin ester comprises at least one of a glycerol rosin ester, a pentaerythritol rosin ester, a hydrogenated glycerol rosin ester, a hydrogenated pentaerythritol rosin ester, or any combination thereof. In some embodiments, the rosin ester comprises a hydrogenated version of any one or more of the foregoing rosin esters.

In some embodiments, the at least one tackifier comprises at least one terpene resin, at least one petroleum resin, at least one hydrogenated rosin, at least one rosin milk, at least one petroleum resin emulsion, at least one terpene-phenolic resin, at least one hydrogenated petroleum resin, at least one aliphatic hydrocarbon resin, at least one hydrogenated aliphatic hydrocarbon resin, at least one aromatic modified aliphatic hydrocarbon resin, at least one hydrogenated aromatic modified aliphatic hydrocarbon resin, at least one polycyclopentadiene resin, at least one hydrogenated polycyclopentadiene resin, at least one cycloaliphatic hydrocarbon resin, at least one hydrogenated cycloaliphatic resin, cycloaliphatic/aromatic hydrocarbon resin, at least one hydrogenated cycloaliphatic/aromatic hydrocarbon resin, hydrogenated aromatic hydrocarbon resin, at least one maleic acid/anhydride modified tackifier, terpene modified aromatic and/or aliphatic hydrocarbon resin, at least one hydrogenated terpene modified aromatic and/or aliphatic hydrocarbon resin, at least one polyterpene resin, at least one hydrogenated polyterpene resin, at least one aromatic modified polyterpene resin, at least one hydrogenated aromatic modified polyterpene resin, at least one terpene-phenol resin, at least one hydrogenated terpene-phenol resin, at least one gum rosin resin, at least one hydrogenated gum rosin resin, at least one gum rosin ester resin, at least one wood rosin resin, at least one hydrogenated wood rosin resin, at least one rosin acid resin, at least one hydrogenated rosin acid resin, or any combination thereof.

In some embodiments, the sprayable composition comprises 1% to 75%, for example, 1%, 10%, 20%, 30%, 40%, 50%, 60%, 70%, or 75%, including ranges between any of the foregoing values, by weight of the at least one tackifier based on a total weight of the sprayable composition. In some embodiments, the sprayable composition does not comprise at least one tackifier.

In some embodiments, the sprayable composition comprises an antioxidant. In some embodiments, the antioxidant includes at least one of a hindered phenolic antioxidant, a sterically hindered primary phenolic antioxidant stabilizer, an organophosphate antioxidant, an aromatic amine antioxidant, or any combination thereof. Non-limiting examples of antioxidants include, for example and without limitation, at least one of the hindered phenolic antioxidants, such as, the Irganox® family of antioxidants (available from BASF, Florham Park, N.J., US) and the Anox® family of antioxidants (available from Addivant, Danbury, Conn., US); organophosphite antioxidants, such as, the Irgofos® family of antioxidants (available from BASF, Florham Park, N.J., US) and the Ultranox® family of antioxidants (available from Addivant, Danbury, Conn., US); and the aromatic amine antioxidants such as the Naugard® family of antioxidants (available from Addivant, Danbury, Conn., US) and Agerite® Stalite® family of antioxidants (available from Vanderbilt Chemicals, LLC, Norwalk, Conn., US).

In some embodiments, the sprayable composition comprises 0.01% to 10%, for example, 0.01%, 0.05%, 0.1%, 0.5%, 1%, 2%, 3%, 4%, 5%, 6%, 7%, 8%, 9%, or 10%, including ranges between any of the foregoing values, by weight of the antioxidant based on a total weight of the sprayable composition. In some embodiments, the sprayable composition does not comprise an antioxidant.

In some embodiments, the sprayable composition comprises a colorant. In some embodiments, the colorant includes at least one of a pigment, a dye, or any combination thereof. In some embodiments, the colorant includes at least one of a reflective pigment, a transition metal oxide, a cool pigment, a metallic pigment, a metallic particle, a mirrored pigment, a light scattering additive, an opacifier, a thin-film coated particle, a near infrared-reflecting pigment, light-interference platelet pigment, a silica pigment, a metal flake pigment, an inorganic pigment, or any combination thereof. Non-limiting examples of pigments and dyes include, without limitation, at least one of an infrared reflective pigment/dye, a phosphorescence pigment/dye, a fluorescence pigment/dye, or any combination thereof. In some embodiments, the colorant includes at least one of $TiO_2$, alumina, silica, iron oxide, tin oxide, $SiO_2$, aluminum oxide, mica, rutile, anatase, alloys, aluminum, iron, copper, brass, titanium, cobalt, stainless steel, chromium, nickel, or any combination thereof. In some embodiments, the pigment includes at least one of zinc oxide, antimony oxide, zirconium oxide, chromium oxide, iron oxide, lead oxide, zinc sulfide, titanium dioxide (anatase, rutile, or brookite), lithopone, and carbon black, or any combination thereof.

In some embodiments, the sprayable composition comprises 0.01% to 10%, for example, 0.01%, 0.05%, 0.1%, 0.5%, 1%, 2%, 3%, 4%, 5%, 6%, 7%, 8%, 9%, or 10%, including ranges between any of the foregoing values, by weight of the colorant based on a total weight of the sprayable composition. In some embodiments, the sprayable composition does not comprise a colorant.

In some embodiments, the sprayable composition comprises an additive. In some embodiments, the additive includes at least one of waxes (e.g., paraffin-based waxes and synthetic Fischer-Tropsch waxes), adhesion promoters, process oils, stabilizers (e.g., antioxidants and UV stabilizers), processing aids, plasticizers (e.g., benzoates and phthalates), paraffin oils, nucleating agents, optical brighteners, biocides, flame retardants, anti-static agents, anti-slip agents, anti-blocking agents, lubricants, fillers, or any combination thereof.

In some embodiments, the filler includes at least one of nepheline syenite, calcium carbonate, barium sulfate, iron oxide, diatomaceous earth, melamine, quartz, silica, colloidal silica, crystalline silica, precipitated silica, amorphous silica, titanium dioxide, alumina trihydrate, zinc oxide, zirconium oxide, zirconium silicate, zinc borate, chromic oxide, crystalline silica fine powder, amorphous silica fine powder, silicone rubber powder, glass, glass bubbles, glass powder, zeolites, silica hydrogen, silica aero gel, calcium silicate, aluminum silicate, ground tire rubber, aluminum oxide, ferrite, carbon black, graphite, mica, clay, bentonite, ground quartz, kaolin, calcined kaolin, wollastonite, hydroxyapatite, hydrated alumina, magnesium hydroxide, vermiculite, talcum, slaked lime, or any combination thereof.

In some embodiments, the sprayable composition comprises 0.01% to 10%, for example, 0.01%, 0.05%, 0.1%, 0.5%, 1%, 2%, 3%, 4%, 5%, 6%, 7%, 8%, 9%, or 10%, including ranges between any of the foregoing values, by weight of the additive based on a total weight of the sprayable composition. In some embodiments, the sprayable composition does not comprise any one or more of the additives disclosed herein.

In some embodiments, the sprayable composition comprises a solvent. In some embodiments, the solvent comprises at least one of an organic solvent, an aqueous solvent, or any combination thereof. In some embodiments, the solvent comprises at least one of toluene, cyclohexane, acetone, methanol, ethanol, n-propanol, isopropyl alcohol, n-butanol, isobutanol, sec-butanol, tert-butanol, n-amyl alcohol, isoamyl alcohol, sec-amyl alcohol, tert-amyl alcohol, 1-ethyl-1-propanol, 2-methyl-1-butanol, n-hexanol, cyclohexanol, or any combination thereof.

In some embodiments, the sprayable composition comprises 25% to 95%, for example, 25%, 35%, 45%, 55%, 65%, 75%, 85%, or 95%, including ranges between any of the foregoing values, by weight of the solvent based on a total weight of the sprayable composition. In some embodiments, the sprayable composition does not comprise any one or more of the solvents disclosed herein.

In some embodiments, a solids content of the sprayable composition is 2.5% to 90%, for example 2.5%, 5%, 10%, 20%, 30%, 40%, 50%, 60%, 70%, 80%, or 90%, including ranges between any of the foregoing values, by weight based on a total weight of the sprayable composition. As used herein, the term "solid(s)" refers to a component of the sprayable composition other than a solvent. For example, in some embodiments, the solids comprise at least one of a polymer, a tackifier, an antioxidant, a colorant, an additive, or any combination thereof. In some embodiments, the solids do not comprise a tackifier. In some embodiments, the solids do not comprise an antioxidant. In some embodiments, the solids do not comprise a colorant. In some embodiments, the solids do not comprise an additive.

In some embodiments, the sprayable composition has a viscosity of 2000 centipoise (cP) or less, for example, 2000 cP or less, 1500 cP or less, 1000 cP or less, 500 cP or less, or 100 cP or less, including ranges between any of the foregoing values, when measured at a temperature of 25° C. using a Brookfield viscometer with a spindle #2 and a viscometer speed of 20 RPM for 1 minute.

In some embodiments, the sprayable composition has a viscosity of 50 cP to 2000 cP, for example, 50, 100, 500, 1000, 1500, or 2000 cP, including ranges between any of the foregoing values, when measured at a temperature of 25° C. using a Brookfield viscometer with a spindle #2 and a viscometer speed of 20 RPM for 1 minute.

Some embodiments relate to a method of installation of a sprayable composition. FIG. 1 is a flowchart of a method of installation, according to some embodiments. As shown in FIG. 1, the method of installation 100 may comprise any one or more of the following steps: obtaining 102 a spray device, obtaining 104 a sprayable composition, pressurizing 106 the container of the spray device, and spraying 108 the sprayable composition onto a substrate.

At step 102, in some embodiments, the method 100 comprises obtaining a spray device. In some embodiments, the spray device comprises a container. In some embodiments, the spray device comprises a pump. In some embodiments, the spray device comprises a sprayer. In some embodiments, the obtaining 102 comprises obtaining at least one of a container, a pump, a sprayer, or any combination thereof.

In some embodiments, the obtaining 102 comprises connecting the container with at least one of the sprayer, the pump, or any combination thereof, to provide a spray device. In some embodiments, the method comprises connecting the container with at least one of the sprayer, the pump, or any combination thereof, to provide a spray device. In some embodiments, the container is connected with at least one of the sprayer, the pump, or any combination thereof, by at least one hose.

In some embodiments, the spray device comprises a chassis to which at least one of the container, the pump, the sprayer, or any combination thereof are configured to be or are at least one of mounted, connected, or any combination thereof to or on the chassis, whether removably or permanently. In some embodiments, the spray device comprises a backpack spray device. In some embodiments, the backpack spray device comprises at least one shoulder strap to removably attach the spray device to a user. In some embodiments, the spray device comprises a hand-held spray device. In some embodiments, the hand-held spray device is configured to be carried by hand during the use of the spray device.

In some embodiments, the container is configured to contain a sprayable composition in its interior. In some embodiments, the container comprises a pressurizable container, i.e. a container that is capable of being pressurized. In some embodiments, the container comprises at least one of a refillable container, a non-refillable container, or any combination thereof.

In some embodiments, the pump is configured to pressurize the container. In some embodiments, the pump is configured to pressurize the container and a sprayable composition within the container. In some embodiments, the pump comprises at least one of a rotary pump, a linear pump, a piston pump, a diaphragm pump, a screw pump, a hydraulic pump, a rotary vane pump, an impeller pump, a centrifugal pump, a peristaltic pump, or any combination thereof. In some embodiments, the pump is powered by at least one of an engine, electricity, a battery, manual power, or any combination thereof. In some embodiments, the engine comprises an internal combustion engine that burns a fuel such as at least one a gasoline, a diesel fuel, a propane, or any combination thereof. In some embodiments, the battery comprises at least one of a rechargeable battery, a non-rechargeable battery, or any combination thereof. In some embodiments, the battery comprises at least one of a lead-acid, a nickel-cadmium, a nickel-metal hydride, a lithium-ion, a thin film lithium-ion, a lithium polymer, a lithium-sulfur, or any combination thereof.

In some embodiments, the sprayer comprises at least one nozzle. In some embodiments, the sprayer comprises a wand. In some embodiments, the sprayer comprises a wand and at least one nozzle at the end of the wand.

At step 104, in some embodiments, the method comprises obtaining a sprayable composition. In some embodiments, the sprayable composition comprises any one or more of the sprayable compositions disclosed herein. For example, the sprayable composition comprises an adhesive composition that does not comprise a propellant. In some embodiments, the obtaining 104 comprises obtaining the sprayable composition in the container of the spray device. In some embodiments, the obtaining 104 comprises obtaining the sprayable composition in a container that is not the container of the spray device. In some embodiments, the obtaining 104 comprises filling at least a portion of the container with the sprayable composition. In some embodiments, the method comprises filling at least a portion of the container of the spray device with the sprayable composition.

In some embodiments, the filling at least a portion of the container of the spray device comprises filing 1% to 95%, for example, 1%, 5%, 10%, 15%, 20%, 25%, 30%, 35%, 40%, 45%, 50%, 55%, 60%, 65%, 70%, 75%, 80%, 85%, 90%, or 95%, including ranges between any of the foregoing values, by volume of the interior of the container of the spray device based on the total volume of the interior of the container, with the sprayable composition. In some embodiments, the sprayable composition does not completely fill the interior of the container in order to leave a volume void of the sprayable composition which can be utilized for pressurizing the container.

At step 106, in some embodiments, the method comprises pressurizing the container of the spray device. In some embodiments, the pressurizing 106 comprises operating the pump to pressurize the container. In some embodiments, the pressurizing 106 comprises pressurizing the container to a predetermine pressure. In some embodiments, the pressurizing 106 comprises pressurizing the container to a pressure sufficient to spray the sprayable composition from the container.

In some embodiments, the pressurizing 160 comprises pressurizing the container to a pressure of 1 psi to 200 psi, for example, 1 psi, 10 psi, 20 psi, 30 psi, 40 psi, 50 psi, 60 psi, 70 psi, 80 psi, 90 psi, 100 psi, 110 psi, 120 psi, 130 psi, 140 psi, 150 psi, 160 psi, 170 psi, 180 psi, 190 psi, or 200 psi, including ranges between any of the foregoing values.

At step 108, in some embodiments, the method comprises spraying the sprayable composition onto a substrate. In some embodiments, the spraying 108 comprises spraying the sprayable composition onto a substrate to form a layer. In some embodiments, the spraying 108 comprises at least one of discharging, dispensing, releasing, or any combination thereof droplets of the sprayable adhesive composition from the container onto the substrate to form a layer.

In some embodiments, the substrate comprises a roofing material. In some embodiments, the roofing material comprises a roofing substrate. In some embodiments, the roofing substrate comprises at least one of a wood, a coverboard, a polyisocyanurate board (such as, but not limited to, a polyisocyanurate board faced with different facer materials, for example, a paper facer, a coated glass facer, a metal facer, a plastic facer, or any combination thereof), a fiberglass insulation board, a metal, a gypsum cover board, a concrete, or any combination thereof. In some embodiments, the roofing substrate comprises at least one of an asphaltic substrate, a plywood substrate, a glass substrate, a cellulosic substrate, a wood material, a metal material, an underlayment, a roofing membrane (reinforced or unreinforced), a roof deck, a photovoltaic (PV) panel, a modified bitumen (MODBIT) substrate, an oriented strand board (OSB), a roll good, a board (such as but not limited to at least one of a foam board (e.g., a polyisocyanurate (ISO) foam board, a coverboard, a fiberglass insulation board or any combination thereof), a fire retardant board, a hail resistant board, a high density cover board, a cement board, concrete, a base sheet, a gypsum cover board, and/or any combination thereof.

In some embodiments, the roofing material comprises at least one of an underlayment, an insulation board, a roofing membrane, or any combination thereof. In some embodiments, the roofing membrane comprises at least one of a thermoplastic polyolefin (TPO), a polyvinyl chloride (PVC), an ethylene propylene diene monomer (EPDM), a silicone membrane, a modified bitumen, or any combination thereof. In some embodiments, the roofing membrane comprises at least one of a fleece, a felt, a scrim, or any combination thereof. In some embodiments, the roofing membrane comprises a waterproof membrane.

In some embodiments, the roofing substrate comprises a low slope roofing substrate. As used herein, the term "low slope" with reference to a roof or a roofing substrate refers to a roof or roofing substrate having a pitch of Y/X, where Y and X are in a ratio of 4:12 or less, where Y corresponds to the "rise" of the roof or roofing substrate, and where X corresponds to the "run" of the roof or roofing substrate.

In some embodiments, the layer comprises at least one of a continuous layer, a discontinuous layer, or any combination thereof. In some embodiments, the layer is formed of droplets located on a surface, wherein the droplets coalesce to form a continuous layer. In some embodiments, the layer is formed of droplets located on a surface, wherein, in the absence of complete coalescence, the droplets form a discontinuous layer.

In some embodiments, the layer covers 1% to 99%, for example, 1, 5, 10, 15, 20, 25, 30, 35, 40, 45, 50, 55, 60, 65, 70, 75, 80, 85, 90, 95, or 99%, including ranges between any of the foregoing values, of a surface of the substrate.

In some embodiments, the layer has a thickness of 1 mil to 200 mils, for example, 1, 5, 10, 20, 30, 40, 50, 60, 70, 80, 90, 100, 110, 120, 130, 140, 150, 160, 170, 180, 190, or 200 mils, including ranges between any of the foregoing values.

In some embodiments, the sprayable composition is sprayed from a container at a rate of 0.1 gallons per minute (GPM) to 5 GPM, for example, 0.1, 0.2, 0.3, 0.4, 0.5, 0.6, 0.7, 0.8, 0.9, 1, 1.5, 2, 2.5, 3, 3.5, 4, 4.5, or 5 GPM, including ranges between any of the foregoing values, onto the substrate.

In some embodiments, the spraying comprises spraying the sprayable composition onto a substrate so as to result in a coverage rate of at least 500 $ft^2$ per five (5) gallons of the sprayable composition. As used herein, the term "coverage rate" corresponds to a surface area covered by the sprayable composition when sprayed onto a substrate so as to result in a layer having a thickness of 1 mil to 200 mil per a given volume of the sprayable composition. In some embodiments, the spraying comprises spraying the sprayable composition onto a substrate so as to result in a coverage rate of at least 750 $ft^2$, at least 1000 $ft^2$, at least 1250 $ft^2$, at least 1500 $ft^2$, at least 1750 $ft^2$, or at least 2000 $ft^2$ per five gallons of the sprayable composition. In some embodiments, the spraying comprises spraying the sprayable composition onto a substrate so as to result in a coverage rate of 500 $ft^2$ to 2000 $ft^2$, for example, 500, 600, 700, 800, 900, 1000, 1100, 1200, 1300, 1400, 1500, 1600, 1700, 1800, 1900, or 2000 $ft^2$, including ranges between any of the foregoing values, per five gallons of the sprayable composition.

In some embodiments, the spraying comprises spraying in a spray pattern. In some embodiments, the spray pattern is an overlapping spray pattern. As used herein, an "overlapping spray pattern" includes an application method in which the sprayable composition is sprayed so as to form a second layer that overlaps or covers a first layer located on a surface. In some embodiments, the first layer comprises the sprayable composition. In some embodiments, the second layer comprises the sprayable composition. In some embodiments, the second layer overlaps 10% to 50%, for example 10, 15, 20, 25, 30, 35, 40, 45, or 50%, including ranges between any of the foregoing values, of the first layer.

In some embodiments, the spray pattern is not an overlapping spray pattern. For example, in some embodiments, the second layer is located adjacent to the first layer. In some embodiments, the second layer abuts the first layer. In some embodiments, the spray pattern is substantially free of an overlapping spray pattern. As used herein, the spray pattern is substantially free of an overlapping spray pattern if the second layer overlaps 1% to 5%, for example, 1, 2, 3, 4, or 5%, including ranges between any of the foregoing values, of the first layer.

In some embodiments, the spray pattern is free of an overlapping spray pattern. As used herein, the spray pattern is free of an overlapping spray pattern if the second layer overlaps 0.1% to 1%, for example, 0.1, 0.2, 0.3, 0.4, 0.5, 0.6, 0.7, 0.8, 0.9, or 1%, including ranges between any of the foregoing values, of the first layer. In some embodiments, the second layer does not overlap the first layer.

In some embodiments, the method comprises applying a roofing material to the layer on the substrate. In some embodiments, the roofing material covers the layer. In some embodiments, the roofing material contacts the layer. In some embodiments, the roofing material directly contacts the layer. In some embodiments, the roofing material comprises any one or more of the roofing materials disclosed herein. For example, in some embodiments, the roofing material comprises at least one of an underlayment, an insulation board, a roofing membrane, or any combination thereof.

Figure 2:
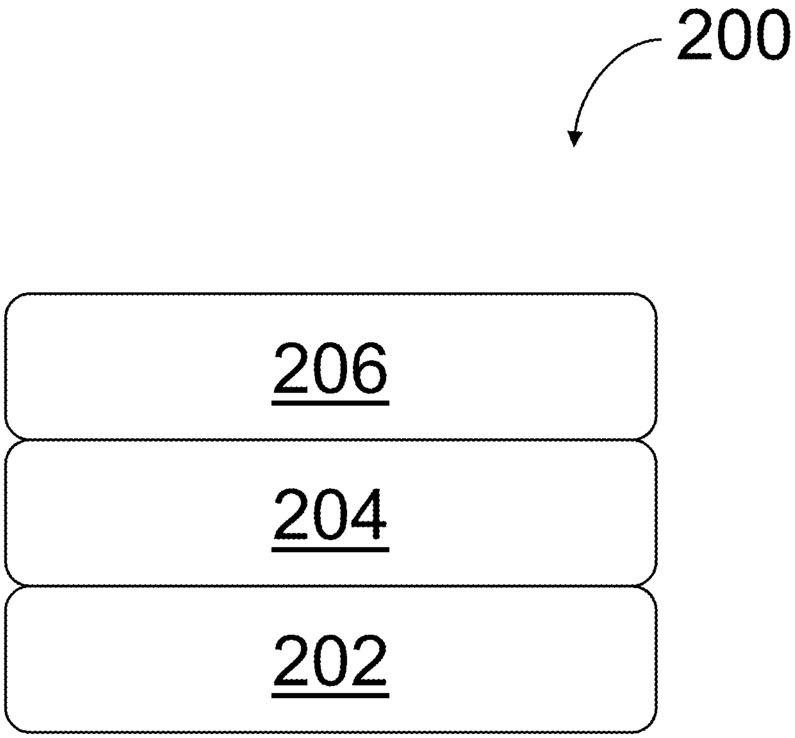
FIG. 2 is a schematic diagram of a cross-section of a roofing system, according to some embodiments.

FIG. 2 is a schematic diagram of a cross-sectional view of a system 200, according to some embodiments. As shown in FIG. 2, in some embodiments, the system 200 comprises a roofing substrate 202, a sprayed layer 204, and a roofing material 206. In some embodiments, the roofing substrate 202 comprises any one or more of the roofing substrates disclosed herein.

In some embodiments, the sprayed layer 204 comprises a layer formed by spraying any one or more of the sprayable compositions disclosed herein onto the roofing substrate. For example, in some embodiments, the sprayed layer 204 comprises an adhesive layer formed by spraying any one or more of the adhesive compositions disclosed herein onto the roofing substrate.

In some embodiments, the roofing material 206 comprises any one or more of the roofing materials disclosed herein. For example, in some embodiments, the roofing material 206 comprises a roofing membrane.

Some embodiments relate to a kit. In some embodiments, the kit comprises a composition, wherein the composition does not comprise a propellant. In some embodiments, the composition comprises any one or more of the sprayable compositions disclosed herein. For example, in some embodiments, the composition comprises an adhesive composition.

In some embodiments, the kit comprises a spray device. In some embodiments, the spray device comprises any one or more of the spray devices disclosed herein. For example, in some embodiments, the spray device comprises at least one of a container, a pump, a sprayer, or any combination thereof.

In some embodiments, when the sprayable composition is contained in the container, the spray device is configured to spray, without a propellant, the adhesive composition onto a substrate to form an adhesive layer on the substrate.

Any one or more of the embodiments disclosed herein shall be understood to be combinable without departing from the scope or spirit of the disclosure.

What is claimed is:

1. A method comprising:

obtaining a spray device, wherein the spray device comprises:

a pump; and a container, wherein the container contains an adhesive composition, wherein the adhesive composition does not comprise a propellant;

wherein the adhesive composition has a viscosity of 2000 cP or less, when measured at a temperature of 25° C. using a Brookfield viscometer with a spindle #2 and a viscometer speed of 20 RPM for 1 minute;

wherein a solids content of the adhesive composition is 2.5% to 90% by weight based on a total weight of the adhesive composition;

operating the pump to pressurize the adhesive composition in the container to a pressure of 1 psi to 200 psi;

spraying the adhesive composition from the container onto a roofing substrate to form an adhesive layer on the roofing substrate; and applying a roofing material to the adhesive layer.

2. The method of claim 1, wherein the spraying comprising spraying the adhesive composition at a coverage rate of 500 $ft^2$ to 2000 $ft^2$ per 5 gallons of the adhesive composition.

3. The method of claim 1, wherein the adhesive layer has a thickness of 1 mil to 200 mils.

4. The method of claim 1, wherein the spraying comprises spraying the adhesive composition from the container at a rate of 0.1 GPM to 5 GPM.

5. The method of claim 1, wherein the roofing substrate comprises at least one of a wood, a coverboard, a polyisocyanurate board, a fiberglass insulation board, a metal, a gypsum board, a concrete, or any combination thereof.

6. The method of claim 1, wherein the pump comprises a pump powered by at least one of electricity, a battery, or any combination thereof.

7. The method of claim 1, wherein the roofing material comprises at least one of an underlayment, an insulation board, a roofing membrane, or any combination thereof.

8. The method of claim 1, wherein a solids content of the adhesive composition is 30% to 90% by weight based on a total weight of the adhesive composition.

9. The method of claim 1, wherein a solids content of the adhesive composition is 50% to 90% by weight based on a total weight of the adhesive composition.

10. A method comprising:

obtaining a container, wherein the container contains an adhesive composition, wherein the adhesive composition does not comprise a propellant;

wherein the adhesive composition has a viscosity of 2000 cP or less, when measured at a temperature of 25° C. using a Brookfield viscometer with a spindle #2 and a viscometer speed of 20 RPM for 1 minute;

wherein a solids content of the adhesive composition is 2.5% to 90% by weight based on a total weight of the adhesive composition;

obtaining a pump;

connecting the container with the pump to obtain a spray device;

operating the pump to pressurize the adhesive composition in the container to a pressure of 1 psi to 200 psi;

spraying the adhesive composition from the container onto a roofing substrate to form an adhesive layer on the roofing substrate; and applying a roofing material to the adhesive layer.

11. The method of claim 10, wherein the spraying comprising spraying the adhesive composition at a coverage rate of 500 $ft^2$ to 2000 $ft^2$ per 5 gallons of the adhesive composition.

12. The method of claim 10, wherein the adhesive layer has a thickness of 1 mil to 200 mils.

13. The method of claim 10, wherein the spraying comprises spraying the adhesive composition from the container at a rate of 0.1 GPM to 5 GPM.

14. The method of claim 10, wherein a solids content of the adhesive composition is 30% to 90% by weight based on a total weight of the adhesive composition.

15. The method of claim 10, wherein a solids content of the adhesive composition is 50% to 90% by weight based on a total weight of the adhesive composition.

16. A method comprising:

obtaining an adhesive composition, wherein the adhesive composition does not comprise a propellant;

wherein the adhesive composition has a viscosity of 2000 cP or less, when measured at a temperature of 25° C. using a Brookfield viscometer with a spindle #2 and a viscometer speed of 20 RPM for 1 minute;

wherein a solids content of the adhesive composition is 2.5% to 90% by weight based on a total weight of the adhesive composition;

obtaining a spray device, wherein the spray device comprises:

a pump; and a container;

filling at least a portion of the container with the adhesive composition;

operating the pump to pressurize the adhesive composition in the container to a pressure of 1 psi to 200 psi;

spraying the adhesive composition from the container onto a roofing substrate to form an adhesive layer on the roofing substrate; and applying a roofing material to the adhesive layer on the roofing substrate.

17. The method of claim 16, wherein the spraying comprising spraying the adhesive composition at a coverage rate of 500 $ft^2$ to 2000 $ft^2$ per 5 gallons of the adhesive composition.

18. The method of claim 16, wherein the adhesive layer has a thickness of 1 mil to 200 mils.

19. The method of claim 16, wherein the spraying comprises spraying the adhesive composition from the container at a rate of 0.1 GPM to 5 GPM.

20. The method of claim 16, wherein a solids content of the adhesive composition is 30% to 90% by weight based on a total weight of the adhesive composition.

* * * * *